United States Patent
Bouwman (10) Patent No.: US 8,465,024 B2
(45) Date of Patent: Jun. 18, 2013

(54) SEALING DEVICE CONFIGURED TO FORM AN AIR SEAL AROUND A PIPE

(75) Inventor: Berend Martijn Bouwman, Ede (NL)

(73) Assignee: Heerema Marine Contractors Nederland B.V., Leiden (NL)

(*) Notice: Subject to any disclaimer, the term of this patent is extended or adjusted under 35 U.S.C. 154(b) by 1259 days.

(21) Appl. No.: 12/199,087

(22) Filed: Aug. 27, 2008

(65) Prior Publication Data
US 2009/0066037 A1 Mar. 12, 2009

Related U.S. Application Data

(60) Provisional application No. 60/970,586, filed on Sep. 7, 2007.

(51) Int. Cl.
*H02G 3/22* (2006.01)
*F01D 11/04* (2006.01)
*F01D 11/06* (2006.01)

(52) U.S. Cl.
USPC ............................ 277/606; 277/431; 277/432

(58) Field of Classification Search
CPC ..................................... F16L 5/10; F16J 15/40
USPC ..................... 277/606, 431, 432; 285/45, 47, 285/53, 337
See application file for complete search history.

(56) References Cited

U.S. PATENT DOCUMENTS

| 2,747,741 | A | * | 5/1956 | Jacobson | 210/304 |
| 4,073,018 | A | * | 2/1978 | Arrowood | 4/696 |
| 4,114,059 | A | * | 9/1978 | Albaric et al. | 310/54 |
| 4,245,844 | A | * | 1/1981 | Pohl et al. | 277/432 |
| 4,305,592 | A | * | 12/1981 | Peterson | 277/430 |
| 6,070,881 | A | * | 6/2000 | Longree | 277/409 |
| 6,352,265 | B1 | * | 3/2002 | Ha | 277/432 |
| 8,215,645 | B1 | * | 7/2012 | Aho, Jr. | 277/370 |
| 2003/0075871 | A1 | * | 4/2003 | Shinozaki | 277/431 |
| 2004/0100033 | A1 | * | 5/2004 | Tong et al. | 277/411 |
| 2007/0056775 | A1 | * | 3/2007 | Gustafson et al. | 175/195 |

* cited by examiner

*Primary Examiner* — Vishal Patel
*Assistant Examiner* — Nathan Cumar
(74) *Attorney, Agent, or Firm* — Hoffmann & Baron, LLP (57) ABSTRACT

The present invention relates to a sealing device that is configured to form a seal around a pipe by use of an air flow in order to prevent a fluid from passing the sealing device. The sealing device includes an air inlet for the inflow of compressed air and configured to be connected to a source of compressed air; one or more channels connected to the air inlet, the channels extending along a substantially annular trajectory and configured to—in use—extend substantially around the pipe; a plurality of outlet points or an annular outlet groove connected to the one or more channels, the outlet points being configured to blow the compressed air in the region of the pipe wall, in order to create an air flow about the pipe in order to prevent a fluid from passing the sealing device.

9 Claims, 8 Drawing Sheets

Figure 1

Prior Art

SEALING DEVICE CONFIGURED TO FORM AN AIR SEAL AROUND A PIPE

CROSS-REFERENCE TO RELATED APPLICATIONS

This application claims the benefit of U.S. Provisional Application No. 60/970,586, filed Sep. 7, 2007, the contents of which are incorporated herein by reference.

FIELD OF THE INVENTION

The present invention relates to a sealing device configured to prevent water running down a pipe into a working station.

BACKGROUND OF THE INVENTION

Several methods are known to lay pipelines from a pipe-lay vessel on a seabed. The present invention relates to J-lay. With the J-lay method, a pipeline is supported by its free end from the pipe-lay vessel and new pipe sections are joined to the free end. The formed pipeline is lowered into the water in a near vertical position via a J-lay tower. The J-lay tower is equipped with one or more working stations where the pipe sections are welded to the end of the already completed pipeline. Other activities may involve application of field joint coating, or installation of appurtenances like anodes and VIV strakes.

The welding process is sensitive for draught and moisture. In order to prevent draught and moisture from reaching a welding zone, the workstation comprises a roof. Since the lengths of pipe that are welded together are in general longer than the height of the working station, the pipe section will penetrate through the roof of the station.

Normally, the roof of the welding station is closed when welding takes place, in order to prevent draught or rain from disrupting the welding process. When the pipe is lowered or during other activities, the roof is opened again, for instance to allow passage of a travelling block.

It is well known to apply a seal between the roof and the pipe to prevent draught and water ingress, in particular when it is raining during welding operations. Known seals are based on contact between the sealing device and the pipeline to close off any gaps. Normally, a flexible material is used at the contact area of the seal, for instance rubber. However, other materials may also be used.

It is found in practice that it is difficult to make a contact seal that completely prevents water to run down the pipe towards the welding area. Because the roof of the welding station is made up from several parts that are moved during opening or closing, the sealing device also needs to be made out of multiple sections to allow passage of items larger than the pipeline. To create a watertight seal, the seams of the different parts of the seal need to be perfectly aligned. This is difficult to realize.

SUMMARY OF THE INVENTION

It is an object of the invention to provide a system that effectively seals off the area where the pipe penetrates the welding station roof.

To this end, the invention provides a sealing device that is configured to form a seal around a pipe by use of an air flow in order to prevent a fluid from passing the sealing device, the sealing device comprising:

an air inlet configured to be connected to a source of compressed air;

one or more channels connected to the air inlet, the channels extending along a substantially annular trajectory such that when a pipe is present in the sealing device the one or more channels extend substantially around the pipe; and a plurality of outlet points or an annular outlet groove connected to the one or more channels, the outlet points or annular outlet groove being configured to blow the compressed air in the region of the pipe wall in order to create an air flow about the pipe which prevents a fluid from passing the sealing device.

The sealing device thus divides the space about the pipe into a wet side and a dry side. The sealing device contains air outlet points (nozzles) which force air under high pressure towards the pipe, the air flow being sufficiently strong to effectively prevent a fluid to run down the pipe and into the working station.

The sealing device may comprise a single annular channel. Also, multiple channels may be provided which each extend along a part of the pipe wall.

In one embodiment, the outlet points or the annular outlet groove are configured to generate an air flow around the pipe in the shape of a vortex. The vortex may be helical. It has been found that an air flow in the form of a vortex or helix is very effective in preventing a fluid from passing the seal.

In one embodiment, the sealing device further comprises one or more contact seals which extend in an annular shape around the pipe and in use are in contact with the pipe wall, the one or more contact seals being configured to prevent draught along the pipe wall from passing the contact seal.

The outlet points or outlet groove generates draught which may also persist in the dry area and which may hinder the welding process. Therefore, on the dry side of the air seal, the annular contact seal may be provided to stop the draught and create a calm atmosphere on the other side of the contact seal. The contact seal thus further divides the dry side into a dry, windy side and a dry, calm side.

In one embodiment, the sealing device is integrated in a roof of a work station for welding pipes, such that the pipe extends substantially vertically through the roof. In this context the sealing device is effectively put to use, allowing continuous welding in most weather conditions.

In one embodiment, the sealing device comprises a substantially frusto-conical shield member configured to extend substantially around the pipe, wherein the shield member has an annular top ridge being configured to define an annular air gap between the top ridge and the pipe wall when a pipe is positioned in the sealing device, wherein the outlet points or the outlet groove are configured to blow the compressed air through the air gap.

The flow of air through the annular air gap enhances the sealing effect. The frusto-conical shape defines a gradual decreasing cross-section of the air gap in the direction of the air flow which has the effect that the velocity of the air increases in the direction of the air flow, leading to an improved air seal around the pipe wall.

Generally, the air gap defines a dry side and a wet side of the air seal, and the outlet points or annular outlet groove are positioned on the dry side of the air gap, and are directed to blow the air through the air gap toward the wet side.

In a further embodiment, the shield member has an outer surface configured to prevent moisture and draught from entering the sealing device from directions different than the air gap. The shield member thus forms a substantially frusto-conical roof of the sealing device.

In a further embodiment, the sealing device comprises at least two parts which are movable from an open position to a closed position, wherein in the closed position the sealing device forms an annular seal around the pipe, and wherein in the open position the sealing device allows objects of a wider diameter than the pipe to pass through the sealing device.

The sealing device will generally be integrated into the roof of a working station. The roof also comprises two sections and can be opened, in order to let large objects pass the roof. One part of the shielding device may be integrated in one roof section while the other part of the shielding device is integrated into the other roof section.

The sealing device of the invention may be added to a contact seal according to the prior art. The rubber seal of the prior art beneath the air nozzles may be required as a precaution for possible negative effects of the air flow, which can for instance cause a draught in the work station.

BRIEF DESCRIPTION OF THE DRAWINGS

The invention will now be further elucidated whereby reference is made to the appended drawings in which.

DETAILED DESCRIPTION OF A PREFERRED EMBODIMENTS

Figure 1:
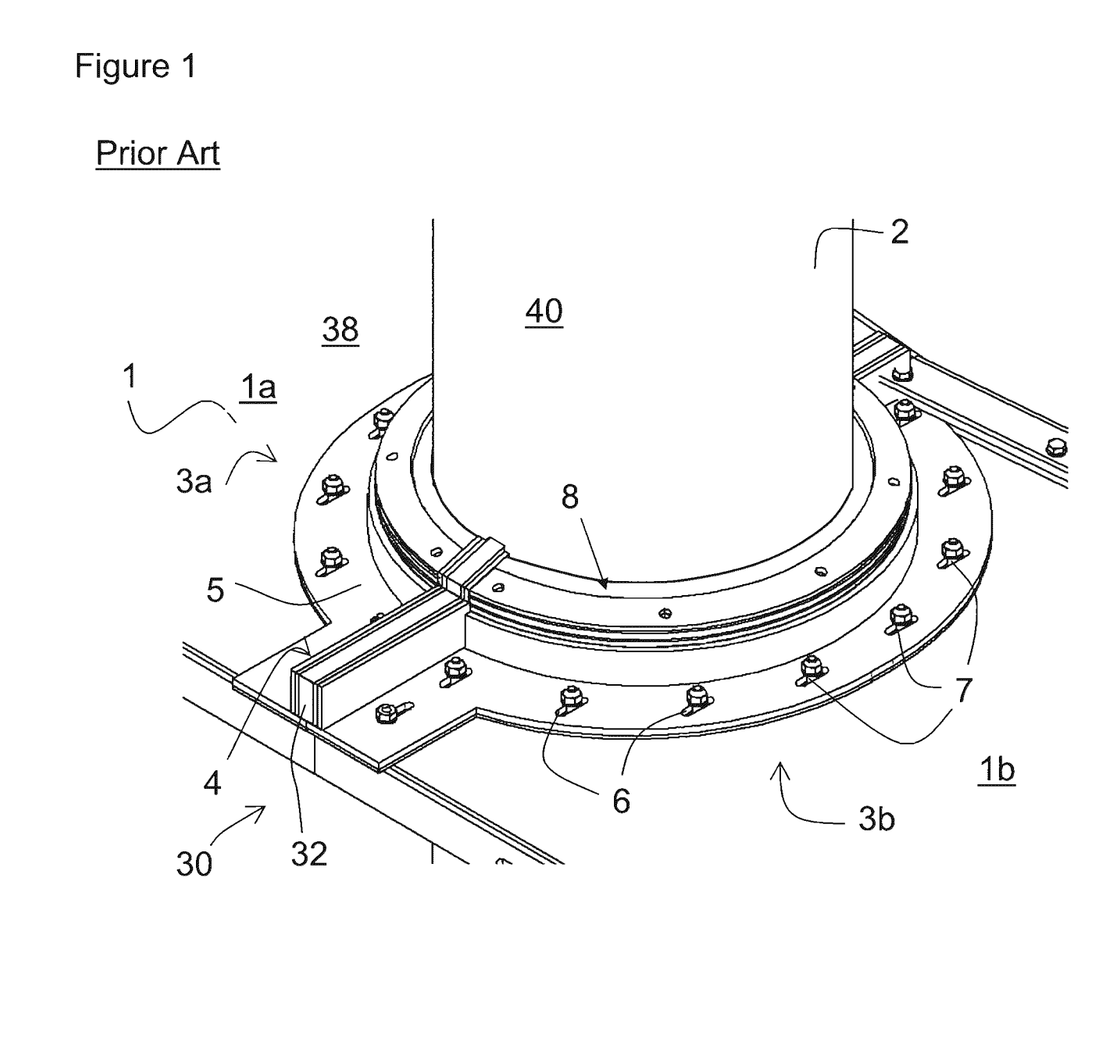
FIG. 1 shows an isometric view of a seal of the prior art based on contact between rubber and the pipe, the seal being in a closed position around a pipeline.
Figure 2:
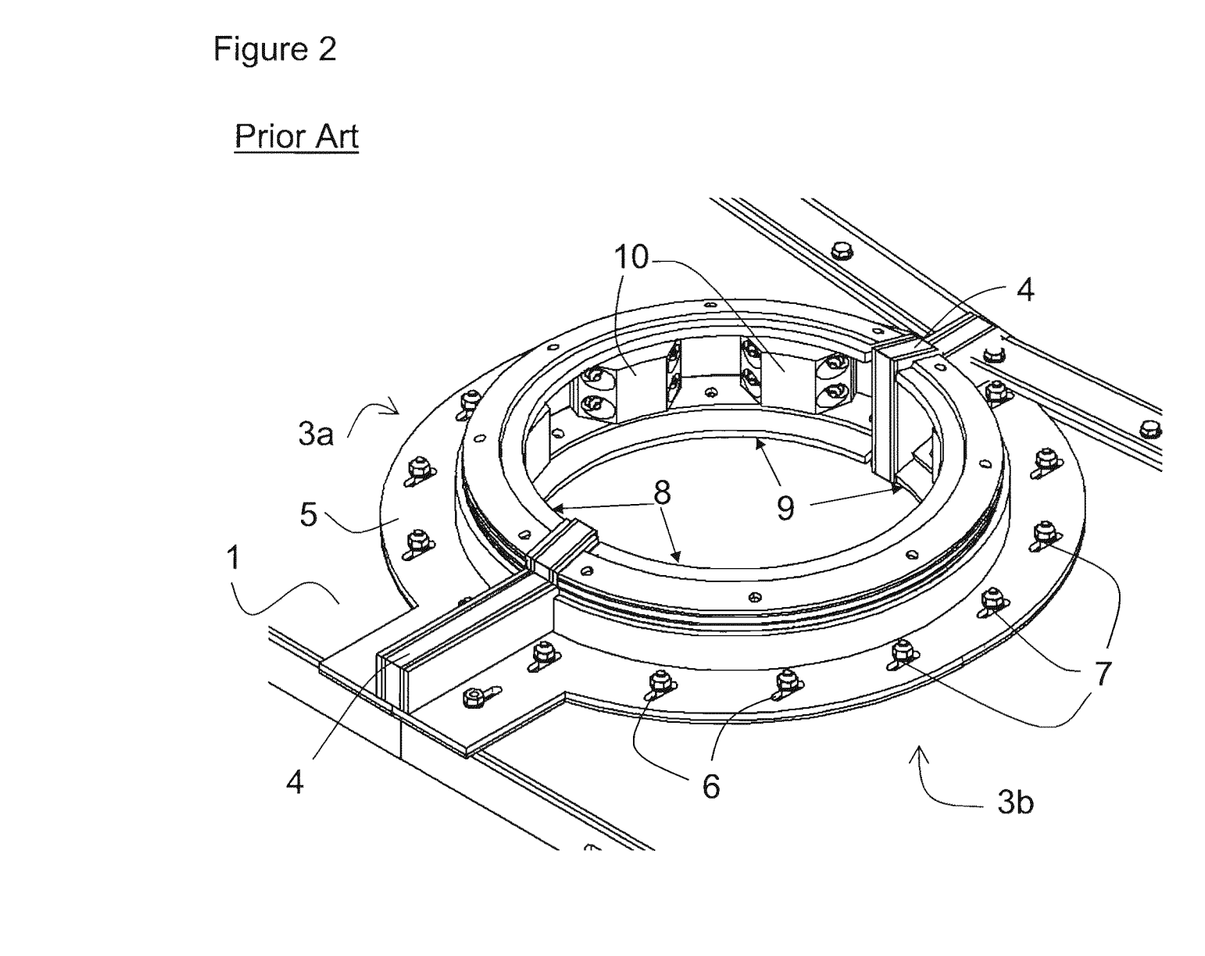
FIG. 2 shows an isometric view of a seal of the prior art based on contact between rubber and the pipe, the seal being in a closed position where the pipe is omitted for reasons of clarity.

FIGS. 1 and 2 show a seal of the prior art. A plane 38 which is to be penetrated by the pipe 2 is defined by the roof 1 of a work station 30. The roof 1 comprises two roof sections 1a and 1b, which may be closed and opened. A sealing device 3 comprises two sealing sections 3a and 3b which are mounted on top of the welding station roof 1, on the respective roof sections. The sealing device 3 extends through the roof 1.

When the roof 1 is closed, the two sealing sections 3a and 3b are pressed against one another. The closing seam 32 between the two sections 3a and 3b is sealed by rubber strips 4.

A base plate 5 of the sealing device 3 is mounted on the roof 1. The connection between the roof 1 and the base plate 5 is made via holes 6 and pins 7. The holes 6 are somewhat larger than the pins 7 in order to allow some movement of the sealing device 3 including the base plate 5 and the pipe 2 relative to the roof 1.

A first seal 8 at the upper side of the roof 1 closes the space between the sealing device 3 and the pipe 2. An additional seal 9 on the bottom side of the roof 1 is provided in order to create a double seal between the pipe 2 and the sealing device 3. In an area between the rubber seals 8 and 9 protection blocks 10 are provided in order to prevent damage to the pipe 2, and any coating that may be applied to the pipe, and any metal parts of the sealing device 3 due to movement of the pipe relative to the roof 1 when the pipe 2 is enclosed by the seal construction.

FIGS. 3 to 8 show a seal construction 36 according to an embodiment of the present invention. The figures show the invention being placed over the seal of the prior art seal as shown in FIGS. 1 and 2. This means that existing seals can easily be equipped with the additional protection as provided by the present invention. However, based on the present invention it is also possible to create a stand-alone seal which can be applied without an existing seal already in place.

Figure 3:
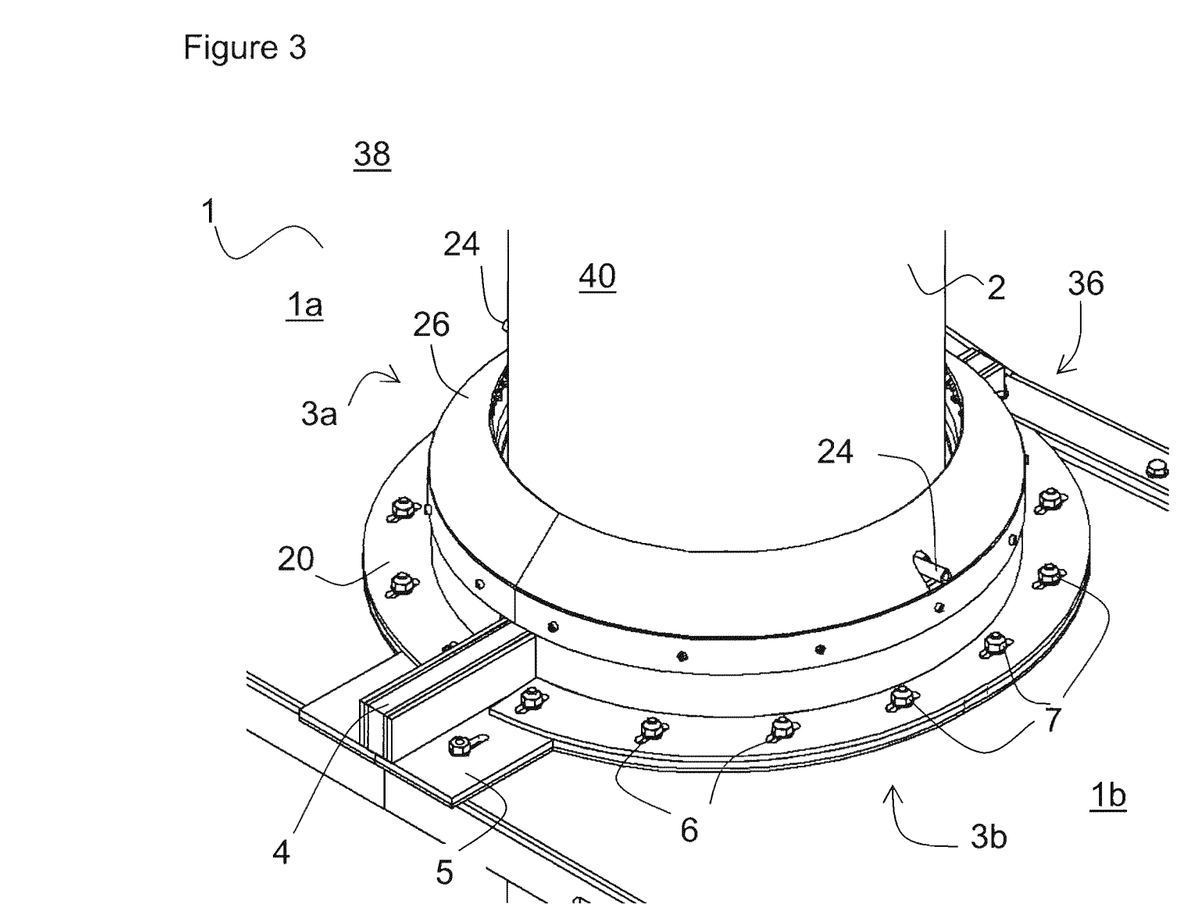
FIG. 3 shows an isometric view of a seal according the present invention in a closed position around a pipeline.
Figure 4:
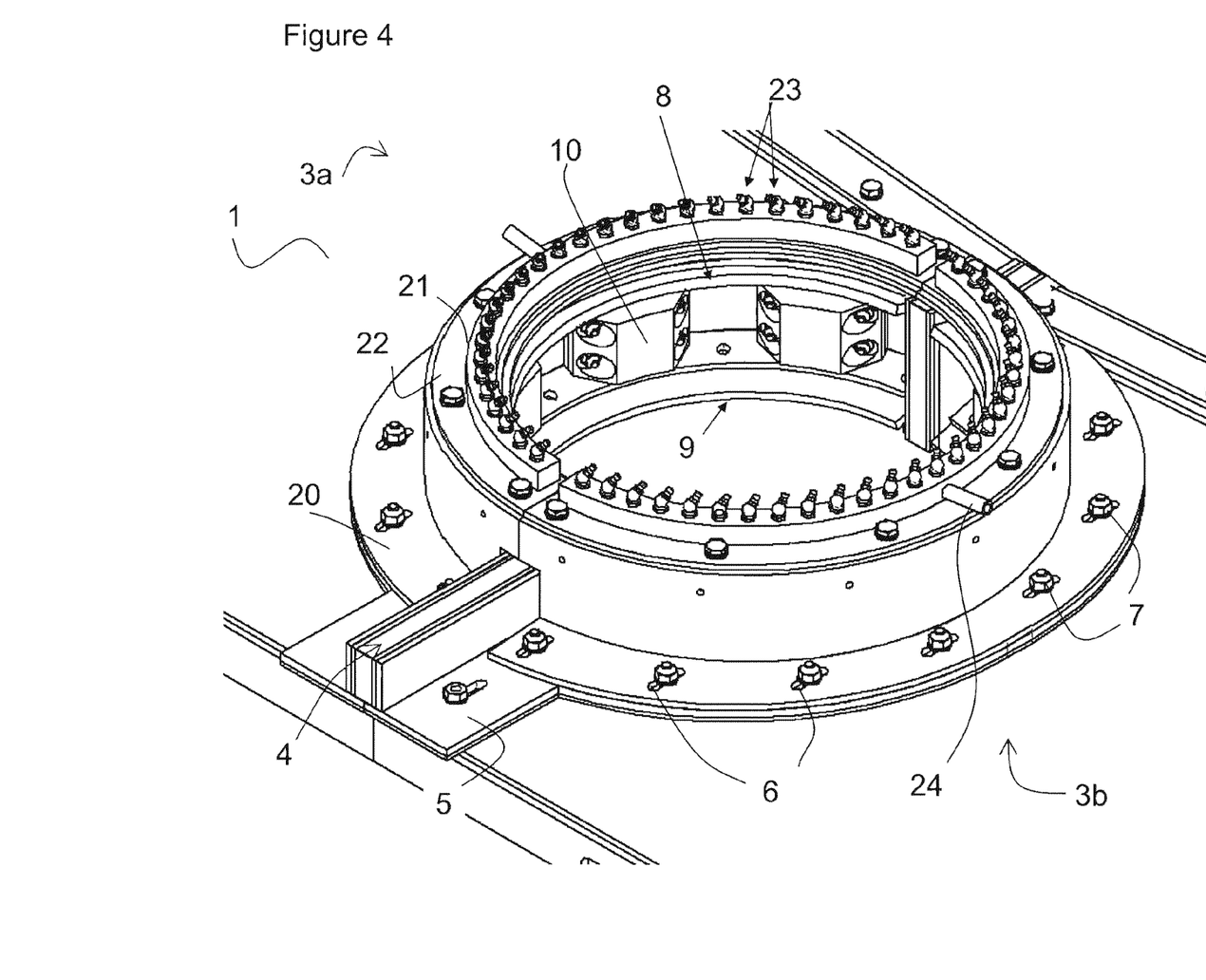
FIG. 4 shows an isometric view of a seal according to the present invention in a closed position wherein the pipe and shield member are omitted for reasons of clarity.
Figure 5:
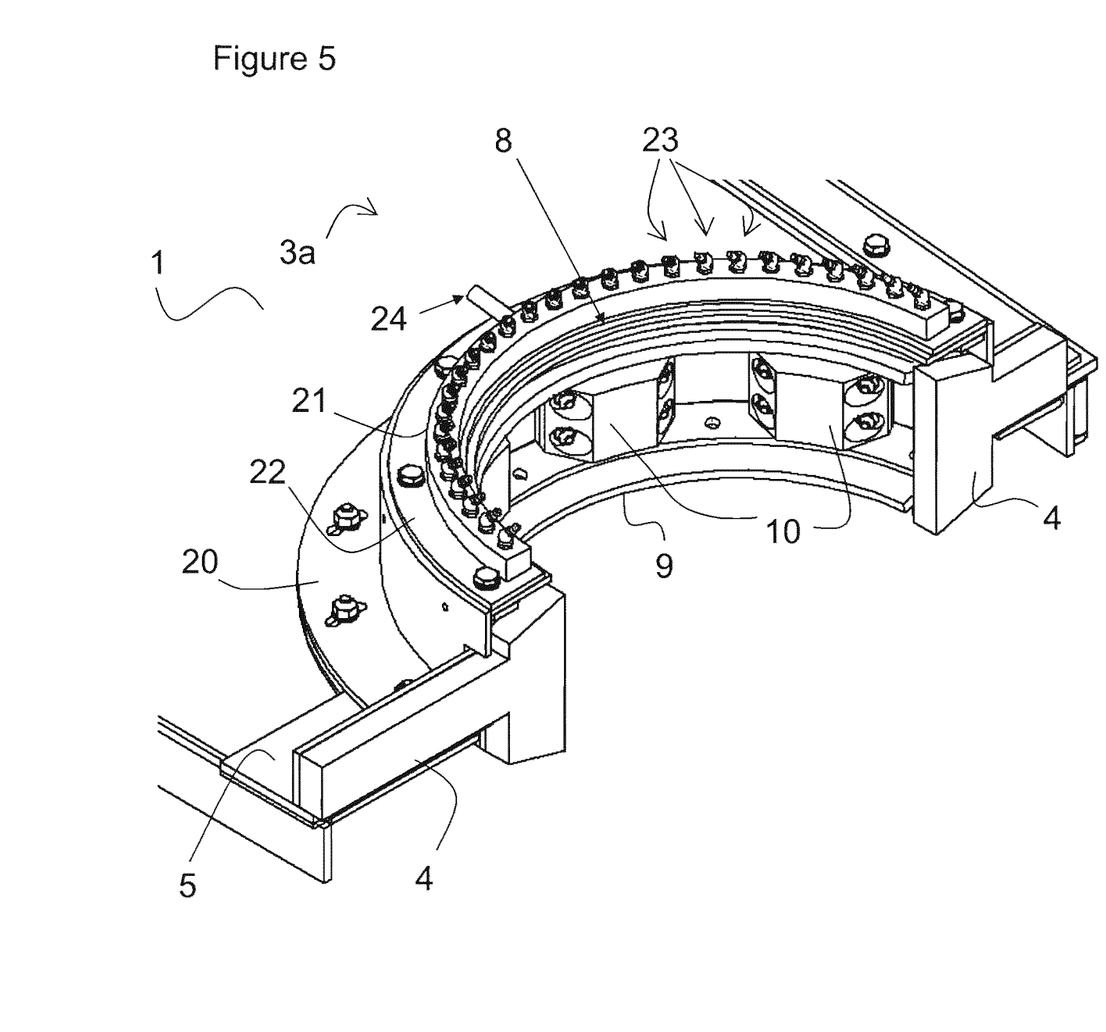
FIG. 5 shows an isometric view of one section of the seal according to the present invention, the shield member being omitted for reasons of clarity.

The pipe 2 extends substantially vertically through the roof 1. The roof defines a substantially horizontal plane 38. On one side of the plane 38, "wet" conditions may prevail in case of bad weather. On the other side of the plane, i.e. within the work station 'dry' conditions should prevail, in order to allow welding of the pipe 2.

On top of the base plate 5 a support structure 20 is placed. On top of this support structure, support rings 20 and 22 are mounted. On the support rings, a channel ring 21 is mounted through which a channel 42 extends, see also FIG. 8.

Figure 8:
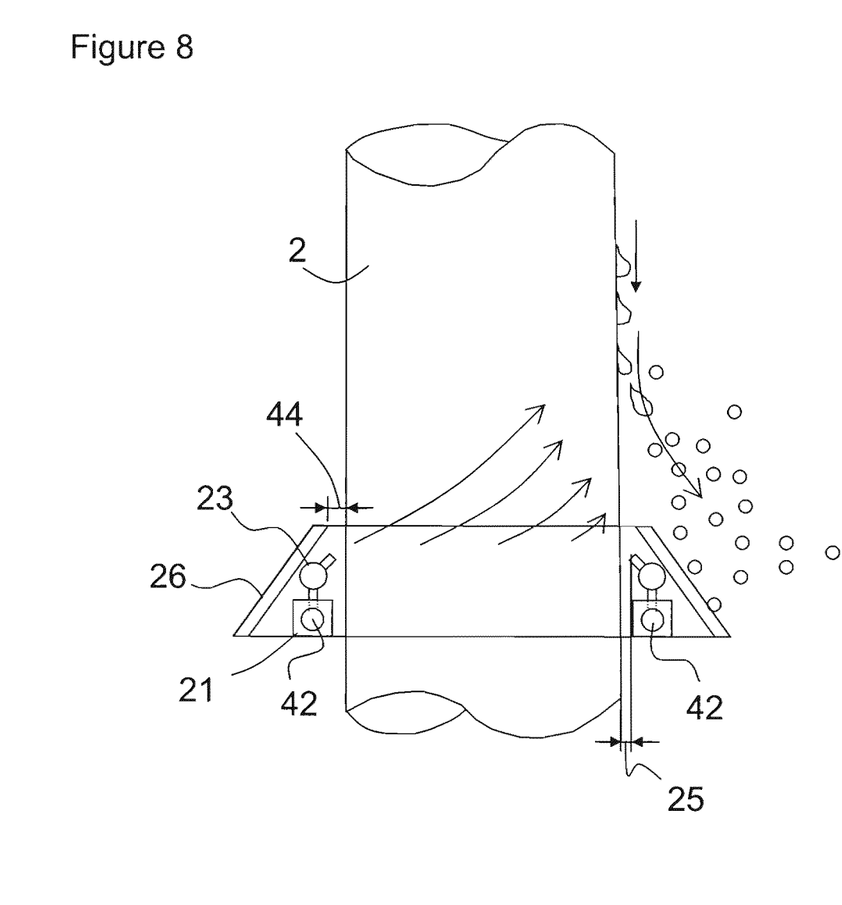
FIG. 8 shows a side view of the pipe and the sealing device, with part of the sealing device being omitted for clarity purposes.

The channel ring 21 comprises two or more parts to cover the full circumference of the pipe and the channel 42 comprises of the same number of parts. Each channel ring 21 is connected to an inlet nozzle 24 through which pressurized air can be supplied to the channel 42. The inlet nozzle 24 may be connected to a source of pressurized air.

In use, pressurized air is forced through the connector 24 into the channel 42 which extends inside ring 21. The air is conveyed through the cavities and exits the ring 21 through nozzles 23.

In an alternative embodiment, a continuous annular groove may be provided instead of the outlet nozzles.

The construction of rings 21 and 22 as shown here is by example only, other constructions can be thought of that will carry the air from an inlet point to multiple outlet nozzles, for instance via a system of hoses.

The air pressure needs to be sufficient to create a flow of air powerful enough to prevent water to run down the pipe 2 towards the seal 8. Testing showed that common industrial air pressure of eight bar is sufficient to create the envisaged seal on a pipe diameter of 16 inch.

There is a distance 25 between the outlet of the nozzles 23 and the wall 40 of the pipe 2. This distance is preferably between one and ten centimeters, more preferably about three centimeters.

The nozzles 23 may be located on the top of ring 21, however alternative embodiments can be possible, for instance with nozzles on the side.

Figure 6:
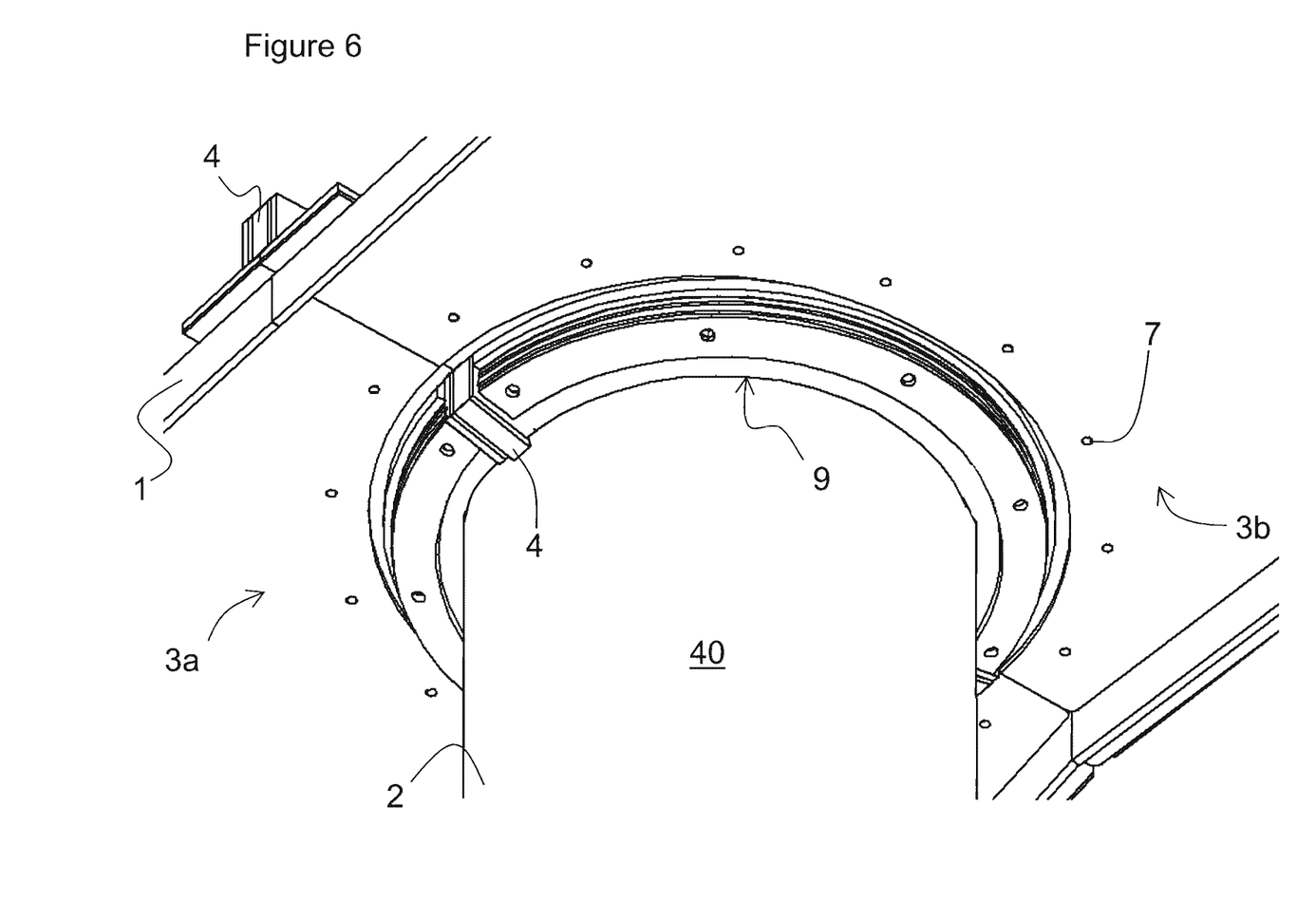
FIG. 6 shows an isometric view of the bottom side of the present invention.

FIG. 6 shows the lower side of the seal construction 3. This is the side that is situated on the inside of the work station.

Figure 7:
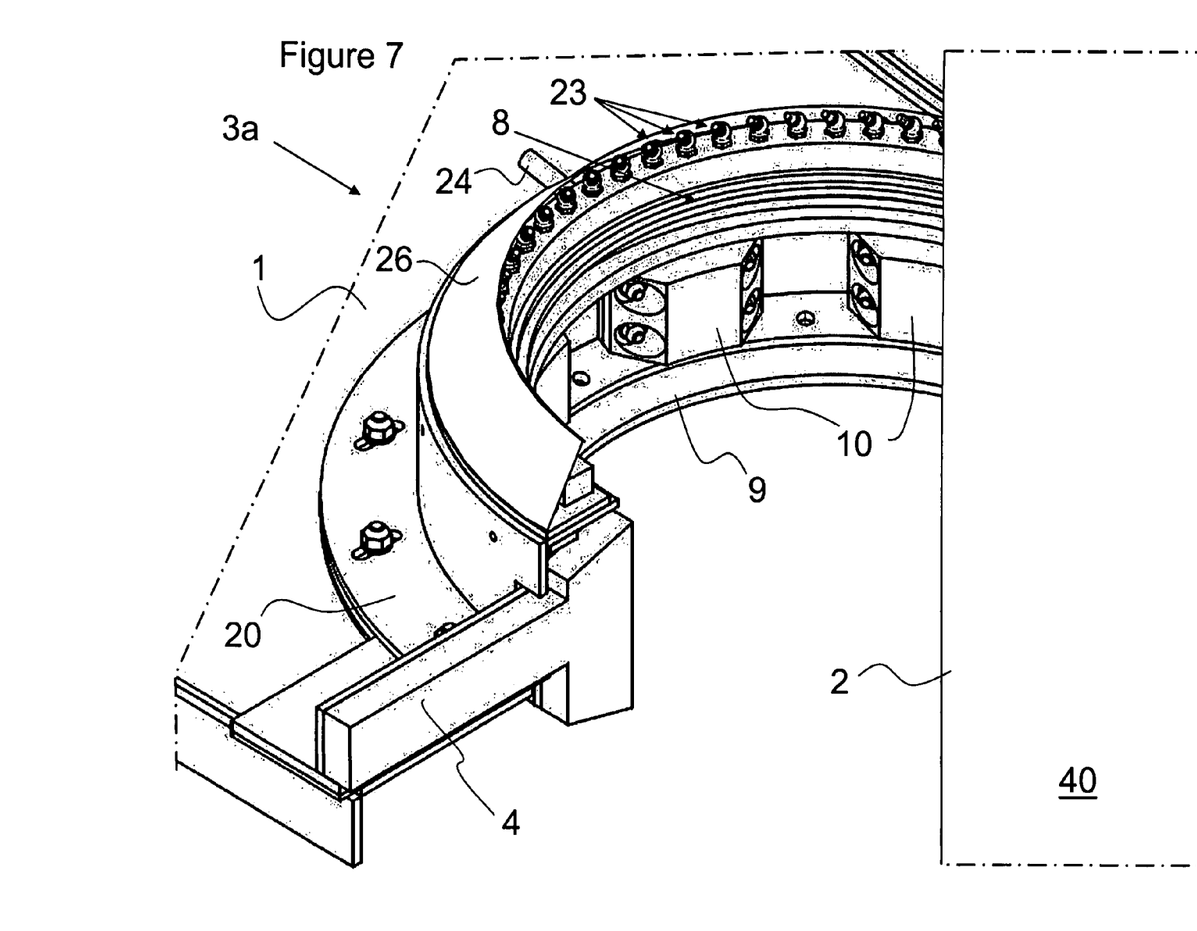
FIG. 7 shows another view of the sealing device of the present invention.

FIG. 7 shows an example of an arrangement of the present invention. It shows one segment 3a of a sealing device 3 according to the present invention in an opened position. Nozzles 23 preferably are installed with a predetermined orientation in order to create a vortex shaped air flow around the pipe. To this end, the nozzles 23 are not directed at a longitudinal axis of the pipe 2 but have an oblique orientation relative to the pipe wall, thereby creating the vortex air flow. The nozzles 23 are also directed upwards in order for the vortex to have a helical shape.

A shield 26 is provided for shielding the pipe from incoming spatter such as for raindrops. The shield is also shown in FIG. 8. The shield 26 has a frusto-conical form and extends substantially around the pipe 2. An upper ridge 46 of the shield 26 defines an air gap 44 between the shield 26 and the pipe wall 40 through which in use the compressed air flows outward and upward.

The form of the shield 26 is such that the cross-section of the air flow decreases in the direction of the flow, thereby increasing the velocity of the air and maximizing the air velocity at the air gap 44, which leads to a very effective seal.

What is claimed is:

1. A work station comprising a sealing device which is connected to a roof of the work station, the sealing device being configured to form a seal around a pipe by use of an air flow in order to prevent a fluid from passing the sealing device, the sealing device comprising:
- an air inlet for the inflow of compressed air, the air inlet configured to be connected to a source of compressed air;
- one or more channels connected to the air inlet, the channels extending along a substantially annular trajectory and configured to extend substantially around the pipe when the pipe is positioned in the sealing device, the channels being positioned at a distance from the pipe wall;
- a plurality of outlet points in an annular arrangement or an annular outlet groove connected to the one or more channels, the outlet points or annular groove being positioned at a distance from the wall of the pipe and being configured to blow the compressed air in the region of the pipe wall, in order to create an air flow about the pipe in order to prevent a fluid from passing the sealing device, the sealing device configured to define an annular air gap between the pipe and the sealing device when a pipe is positioned in the sealing device, wherein the air gap defines a boundary between a region within the work station and a region outside the work station, wherein the outlet points or the annular outlet groove are/is positioned on the inside of the air gap and are/is directed towards the air gap to blow the air through the air gap to the region outside of the work station.

2. The work station of claim 1, where the outlet points or the annular outlet groove are configured to generate an air flow through the annular air gap in the shape of a vortex.

3. The work station device of claim 1, where the outlet points or the annular outlet groove are configured to generate a helical air flow around the pipe.

4. The work station of claim 1, wherein the sealing device further comprises one or more contact seals which extend in an annular shape around the pipe and in use are in contact with the pipe wall, the one or more contact seals being configured to prevent draught along the pipe wall from passing the contact seal.

5. The work station of claim 1, wherein the sealing device is integrated in a roof of a work station for welding pipes, such that the pipe extends substantially vertically through the roof.

6. The work station of claim 1, wherein the sealing device further comprises a substantially frusto-conical shield member configured to extend substantially around the pipe, wherein the shield member has an annular top ridge being configured to define an annular air gap between the shield member and the pipe wall when a pipe is positioned in the sealing device, wherein the outlet points or the outlet groove are configured to blow the compressed air through the air gap.

7. The work station of claim 5, wherein the shield member has an outer surface configured to prevent moisture and draught from entering the sealing device from directions different than the air gap.

8. The work station of claim 1, wherein the sealing device comprises at least two sections which are movable from an open position to a closed position and vice versa, wherein in the closed position the sealing device forms an annular seal around the pipe, and wherein in the open position the sealing device allows objects of a wider diameter than the pipe to pass through the sealing device.

9. The work station of claim 1, wherein the sealing device comprises a shield member which is configured to reduce the cross-section of the air flow in the direction of the flow, thereby increasing the velocity of the air and maximizing the air velocity at the air gap.

\* \* \* \* \*